(12) United States Patent
Fairman

(10) Patent No.: US 6,457,072 B1
(45) Date of Patent: Sep. 24, 2002

(54) SYSTEM AND METHOD FOR EFFECTIVELY PERFORMING PHYSICAL DIRECT MEMORY ACCESS OPERATIONS

(75) Inventor: Bruce A. Fairman, Woodside, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/364,623

(22) Filed: Jul. 29, 1999

(51) Int. Cl.⁷ .......................... G06F 13/28; G06F 13/38
(52) U.S. Cl. ........................................... 710/22; 710/26
(58) Field of Search .............................. 710/22–28, 308

(56) References Cited

U.S. PATENT DOCUMENTS

| | | | |
|---|---|---|---|
| 5,210,749 A | * 5/1993 | Firoozmand | 370/463 |
| 5,752,078 A | * 5/1998 | Delp et al. | 710/7 |
| 5,809,334 A | * 9/1998 | Galdun et al. | 710/22 |
| 5,828,903 A | 10/1998 | Sethuram et al. | 395/817 |
| 5,978,865 A | * 11/1999 | Hansen et al. | 710/22 |
| 6,038,607 A | * 3/2000 | Hamilton et al. | 709/236 |
| 6,304,553 B1 | * 10/2001 | Gehman et al. | 370/235 |
| 6,347,347 B1 | * 2/2002 | Brown et al. | 710/22 |

FOREIGN PATENT DOCUMENTS

| | | | |
|---|---|---|---|
| EP | 0753817 | 1/1997 | G06F/13/12 |
| FR | 2766938 | 6/1998 | G06F/13/42 |
| JP | 7262152 | 10/1995 | G06F/15/163 |

* cited by examiner

*Primary Examiner*—Jeffrey Gaffin
*Assistant Examiner*—Ilwoo Park
(74) *Attorney, Agent, or Firm*—Gregory J. Koerner; Simon & Koerner LLP

(57) ABSTRACT

A system and method for effectively performing physical direct memory access operations comprises a target device with a direct memory access engine that analyzes headers of transfer packets to determine how to successfully perform the physical direct memory access operations. The direct memory access engine includes a notifier module that analyzes notification enable fields from the headers to determine when to provide notifications regarding the occurrence of physical direct memory access operations to device software of the target device.

10 Claims, 9 Drawing Sheets

SYSTEM AND METHOD FOR EFFECTIVELY PERFORMING PHYSICAL DIRECT MEMORY ACCESS OPERATIONS

BACKGROUND OF THE INVENTION

1. Field of the Invention

This invention relates generally to techniques for performing data transfer operations, and relates more particularly to a system and method for effectively performing physical direct memory access operations.

2. Description of the Background Art

Implementing effective methods for transferring data between electronic devices is a significant consideration for designers and manufacturers of contemporary electronic devices. An electronic device in an electronic network may advantageously communicate with other electronic devices in the network to share data to thereby substantially increase the capabilities and versatility of individual devices in the electronic network. For example, an electronic network may be implemented in a home environment to enable flexible and beneficial sharing of data and device resources between various consumer electronic devices, such as personal computers, digital video disc (DVD) devices, digital set-top boxes for digital broadcasting, enhanced television sets, and audio reproduction systems.

Effectively managing data transfer operations in a network of electronic devices may create substantial challenges for designers of electronic networks. For example, enhanced demands for increased device functionality and performance during data transfer operations may require more system processing power and require additional hardware resources across the network. An increase in processing or hardware requirements may also result in a corresponding detrimental economic impact due to increased production costs and operational inefficiencies.

Network size is also a factor that affects the management of data transfer operations in an electronic network. Communications in an electronic network typically become more complex as the number of individual devices or nodes increases. Assume that a particular device on an electronic network is defined as a local device with local software elements, and other devices on the electronic network are defined as remote devices with remote software elements. Accordingly, a local software module on the local device may need to transfer data to various remote software elements on remote devices across the electronic network. However, successfully managing a substantial number of electronic devices across a network may provide significant benefits to a system user.

Furthermore, enhanced device capability to perform various advanced memory transfer operations may provide additional benefits to a system user, but may also place increased demands on the control and management of the various devices in the electronic network. For example, an enhanced electronic network that effectively accesses, processes, and displays digital television programming may benefit from efficient network communication techniques because of the large amount and complexity of the digital data involved.

In many systems, data transfer operations may occur under the control of a processor that initiates and coordinates bi-directional data transfer operations between a memory and a selected external device. However, detailed control of all data transfer operations by a system processor may significantly reduce the amount of processing time available to perform other important tasks.

Direct memory access (DMA) is a data transfer technique that substantially reduces the amount of processing time required from a system processor to perform a data transfer operation. In practice, direct memory access allows an external device to read from, or write to, a memory without significant intervention by the system processor. Typically, the processor may then continue performing other processing tasks.

Due to growing demands on system processor resources and substantially increasing data magnitudes, it is apparent that developing new and effective methods for transferring data is a matter of importance for the related electronic technologies. Therefore, for all the foregoing reasons, implementing effective methods for transferring data between electronic devices remains a significant consideration for designers, manufacturers, and users of contemporary electronic devices.

SUMMARY OF THE INVENTION

In accordance with the present invention, a system and method are disclosed for effectively performing physical direct memory access (DMA) operations. In one embodiment, initially, a DMA engine of a target device in an electronic network preferably receives a packet from an initiator device that is also in the electronic network. The DMA engine then preferably analyzes a header of the received packet to determine how to successfully perform the DMA operation.

If a designated field of the header requests a physical DMA operation, then a notifier module preferably examines a notification enable field to determine whether to provide a notification to target device software about the occurrence of the physical DMA operation. The notifier module thus permits the DMA engine to selectively filter the notifications of physical DMA operations to thereby eliminate time-consuming analysis of unnecessary notifications by the target device software.

In one embodiment, if the notification enable field authorizes the notifier module to notify the device software about the occurrence of the physical DMA operation, then the notifier module preferably forwards the header from the current packet to the device software as a notification. In alternate embodiments, the notifier module may similarly provide various other types of notification to the device software. The DMA engine also preferably utilizes information from the header to successfully perform the requested DMA operation.

In accordance with the present invention, the device software is therefore notified of the physical DMA operation. In various device applications, this timely notification may facilitate optimal utilization of device resources. For example, in a case where an extended series of packets are being transferred by physical DMA for subsequent processing by the device software, an initial notification of the physical DMA operation may advantageously permit the device software to perform an overlapping processing procedure that begins at the time of the initial notification, rather than waiting until the entire DMA data transfer operation is complete. The present invention therefore facilitates and promotes intelligent functioning of device software, and thus efficiently implements a system and method for effectively performing physical DMA operations.

DETAILED DESCRIPTION OF THE PREFERRED EMBODIMENT

The present invention relates to an improvement in data transfer operations. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises a system and method for effectively performing physical direct memory access operations, and includes a target device with a direct memory access engine that analyzes headers of transfer packets to determine how to successfully perform the physical direct memory operations. The direct memory access engine includes a notifier module that analyzes notification enable fields from the headers to determine when to provide notifications regarding the occurrence of physical direct memory access operations to device software of the target device.

Figure 1:
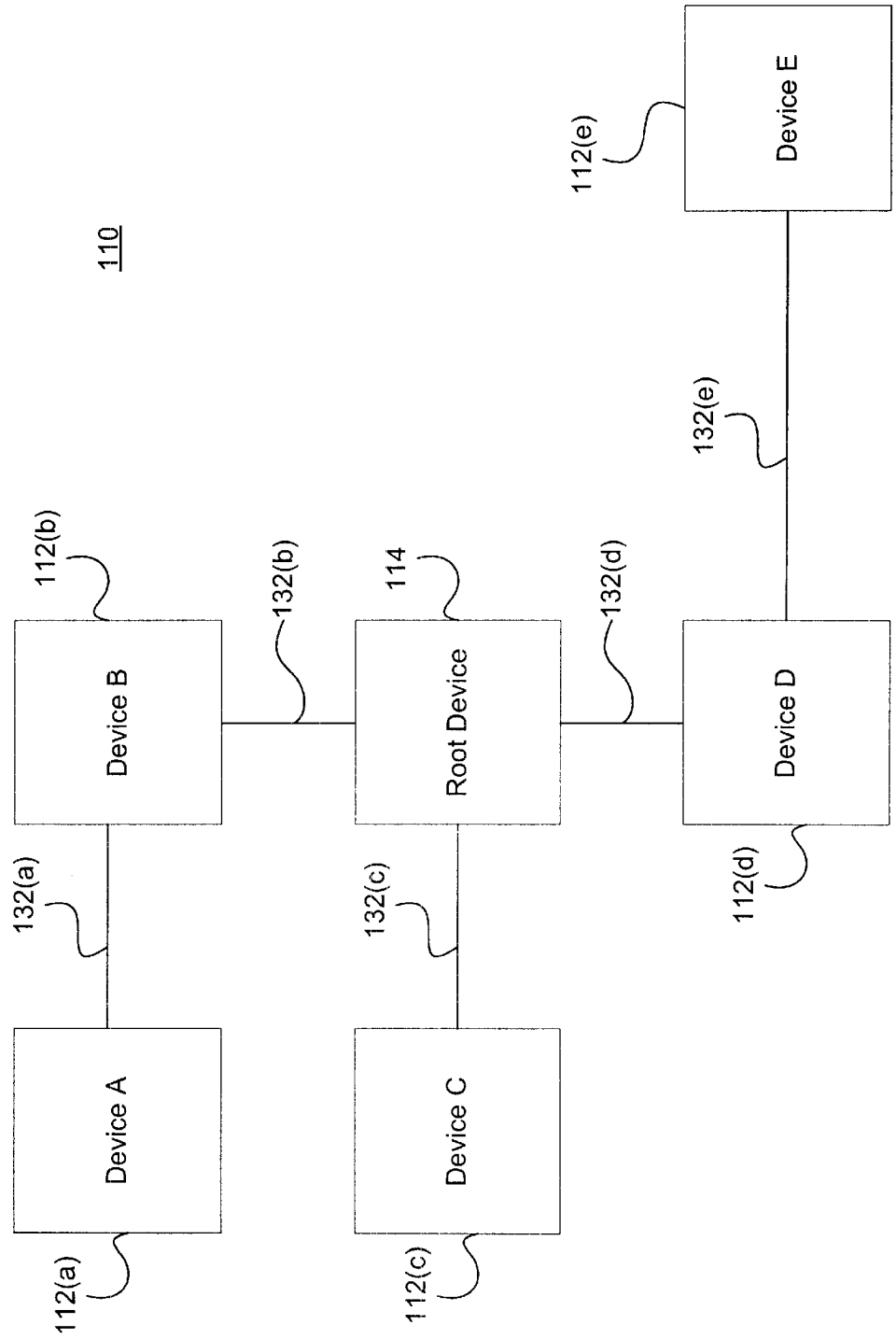
FIG. 1 is a block diagram for one embodiment of an electronic network, in accordance with the present invention.

Referring now to FIG. 1, a block diagram for one embodiment of an electronic network 110 is shown, according to the present invention. In the FIG. 1 embodiment, network 110 preferably comprises, but is not limited to, a number of electronic devices 112 (device A 112(a), device B 112(b), root device 114, device C 112(c), device D 112(d), and device E 112(e)). In alternate embodiments, electronic network 110 may readily be configured to include various other devices 112 or components that function in addition to, or instead of, those discussed in conjunction with the FIG. 1 embodiment. In alternate embodiments, network 110 may readily be connected and configured in any other appropriate and suitable manner.

In the FIG. 1 embodiment, devices 112 of network 110 may be implemented as any type of electronic device, including, but not limited to, personal computers, printers, digital video disc devices, television sets, audio systems, video cassette recorders, and set-top boxes for digital broadcasting. In the FIG. 1 embodiment, devices 112 preferably communicate with one another using a network bus 132.

Network bus 132 preferably includes path 132(a), path 132(b), path 132(c), path 132(d), and path 132(e). For example, device B 112(b) is coupled to device A 112(a) via path 132(a), and to root device 114 via path 132(b). Similarly, root device 114 is coupled to device C 112(c) via path 132(c), and to device D 112(d) via path 132(d). In addition, device D 112(d) is coupled to device E 112(e) via path 132(e). In the FIG. 1 embodiment, network bus 132 is preferably implemented using a P1394 Standard for a High Performance Serial Bus, IEEE, 1995, which is hereby incorporated by reference. However, in alternate embodiments, network 110 may readily communicate and function using various other network interconnectivity methodologies which are equally within the scope of the present invention.

In the FIG. 1 embodiment, each device in electronic network 110 may preferably communicate with any other device within network 110. For example, device E 112(e) may communicate with device B 112(b) by transmitting transfer data via cable 132(e) to device D 112(d), which then may transmit the transfer data via cable 132(d) to root device 114. In response, root device 114 then may transmit the transfer data to device B 112(b) via cable 132(b). In the FIG. 1 embodiment, root device 114 preferably provides a master clock signal to synchronize operations for all devices 112 in network 110. In other embodiments of network 110, any one of the network devices 112 may be designated as the root device or cycle master.

Figure 2:
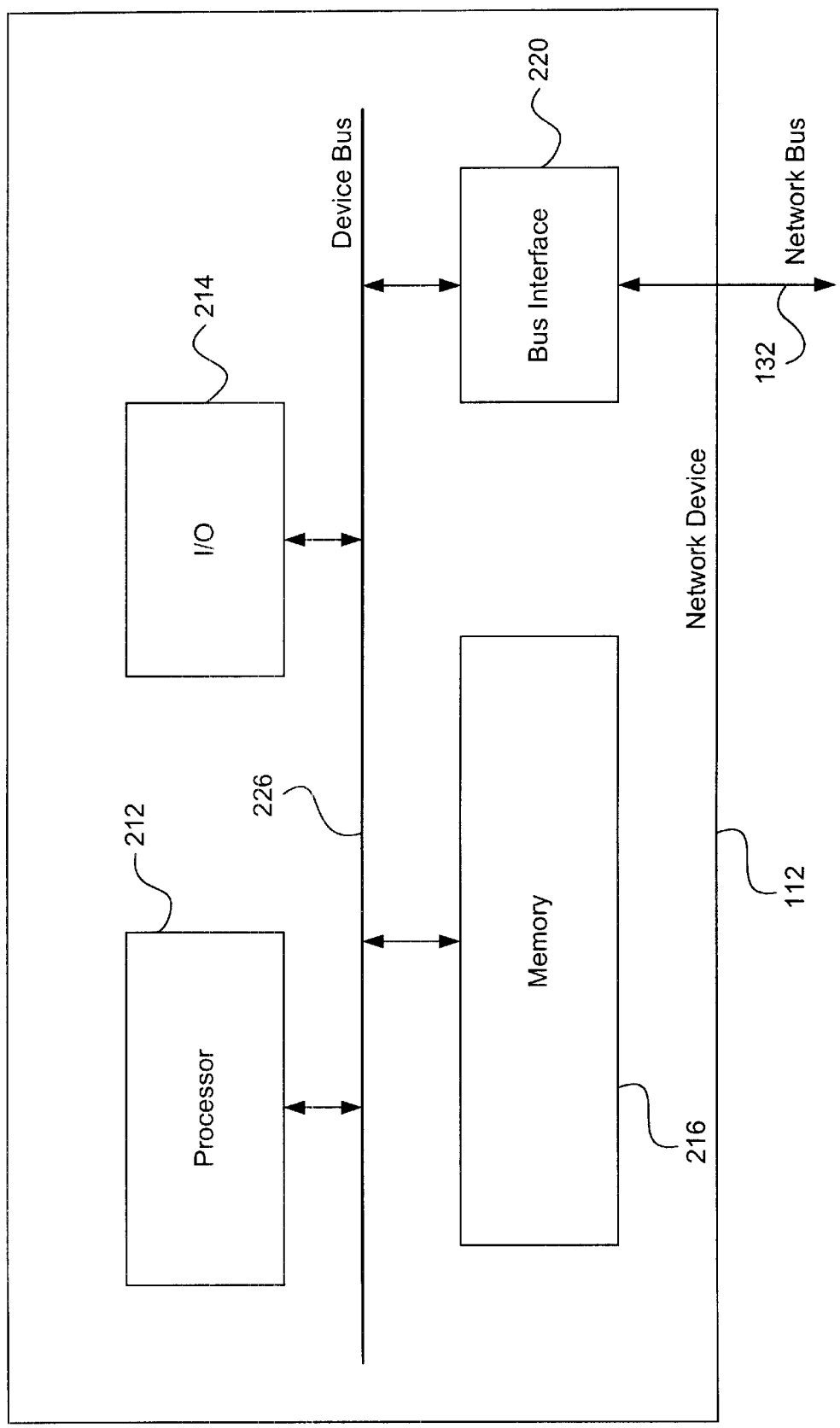
FIG. 2 is a block diagram for one embodiment of an exemplary device of FIG. 1, in accordance with the present invention.

Referring now to FIG. 2, a block diagram for one embodiment of an exemplary device 112 from network 110 is shown, in accordance with the present invention. Device 112 preferably includes, but is not limited to, a processor 212, an input/output (I/O) interface 214, a memory 216, a device bus 226, and a bus interface 220. Processor 212, I/O interface 214, memory 216 and bus interface 220 preferably are each coupled to, and communicate via common device bus 226.

In the FIG. 2 embodiment, processor 212 may be implemented as any appropriate multipurpose microprocessor device. Memory 216 may be implemented as one or more appropriate storage devices, including, but not limited to, read-only memory, random-access memory, and various types of non-volatile memory, such as floppy disc devices or hard disc devices. I/O interface 214 preferably may provide an interface for communications with various compatible sources and/or destinations.

In accordance with the present invention, bus interface 220 preferably provides an interface between device 112 and network 110. In the FIG. 2 embodiment, bus interface 220 preferably communicates with other devices 112 on network 110 via network bus 132. Bus interface 220 also preferably communicates with processor 212, I/O device 214, and memory 216 via a common device bus 226.

Figure 3:
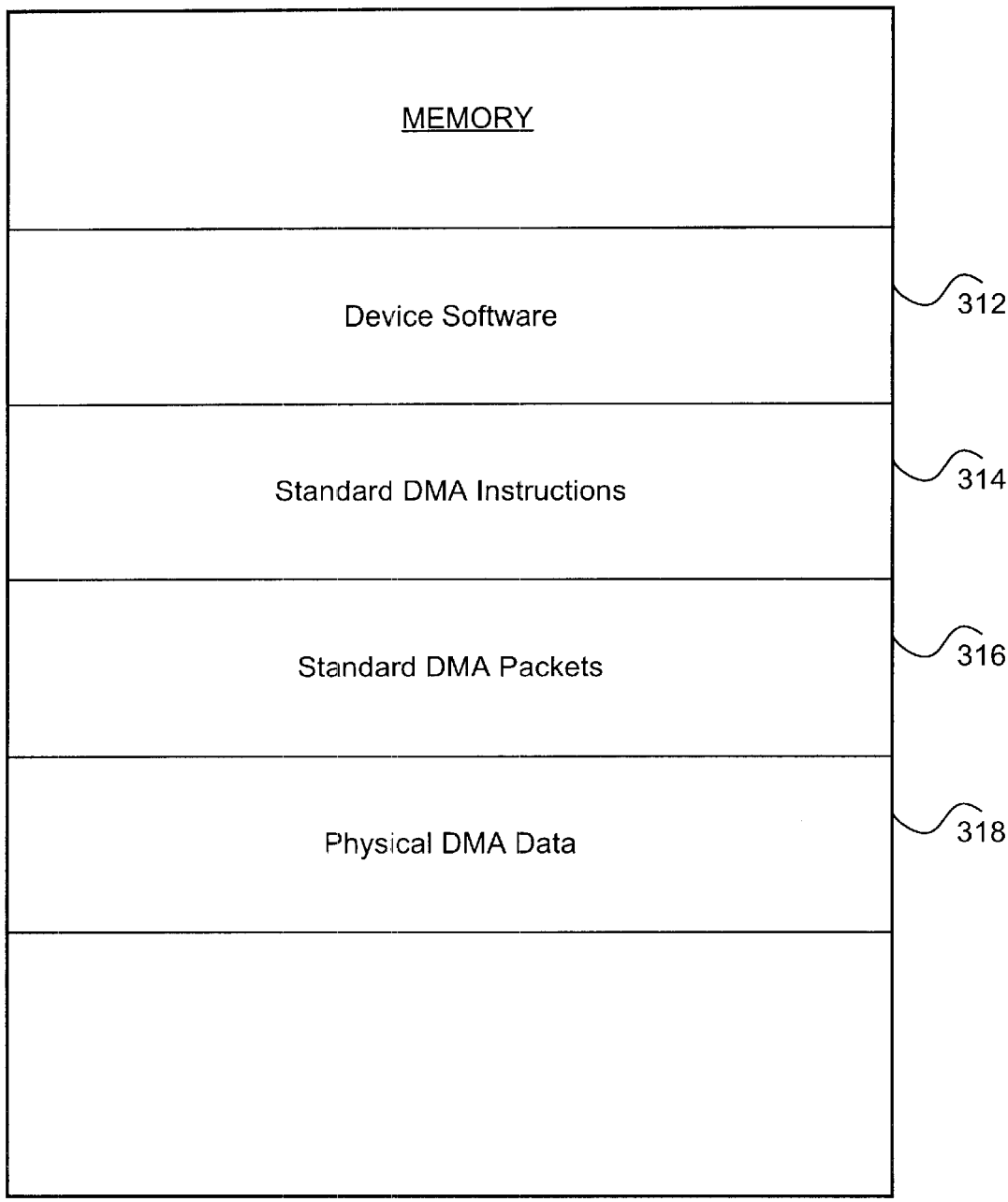
FIG. 3 is a diagram for one embodiment of the memory of FIG. 2, in accordance with the present invention.

Referring now to FIG. 3, a diagram for one embodiment of the FIG. 2 memory 216 is shown, in accordance with the present invention. In the FIG. 3 embodiment, memory 216 preferably includes, but is not limited to, device software 312, standard direct memory access (DMA) instructions 314, standard DMA packets 316, and physical DMA data 318. In alternate embodiments, memory 216 may readily include various other components in addition to, or instead of, the components that are discussed in conjunction with the FIG. 3 embodiment.

In the FIG. 3 embodiment, device software 312 includes software instructions that are preferably executed by processor 212 for performing various functions and operations by device 112. The particular nature and functionality of device software 312 preferably varies depending upon factors such as the type and purpose of the corresponding host device 112.

Standard DMA instructions 314 are preferably executed by DMA engine 422 in bus interface 220 to perform standard DMA transfer operations, as discussed below in conjunction with FIG. 4. Standard DMA packets 316 preferably include packets that are transferred, stored, and processed using standard DMA instructions 314, as also discussed below in conjunction with FIG. 4. In accordance with the present invention, physical DMA data 318 preferably includes data from packets that are efficiently transferred and stored utilizing physical DMA transfer operations, as discussed below in conjunction with FIGS. 4 through 9.

Figure 4:
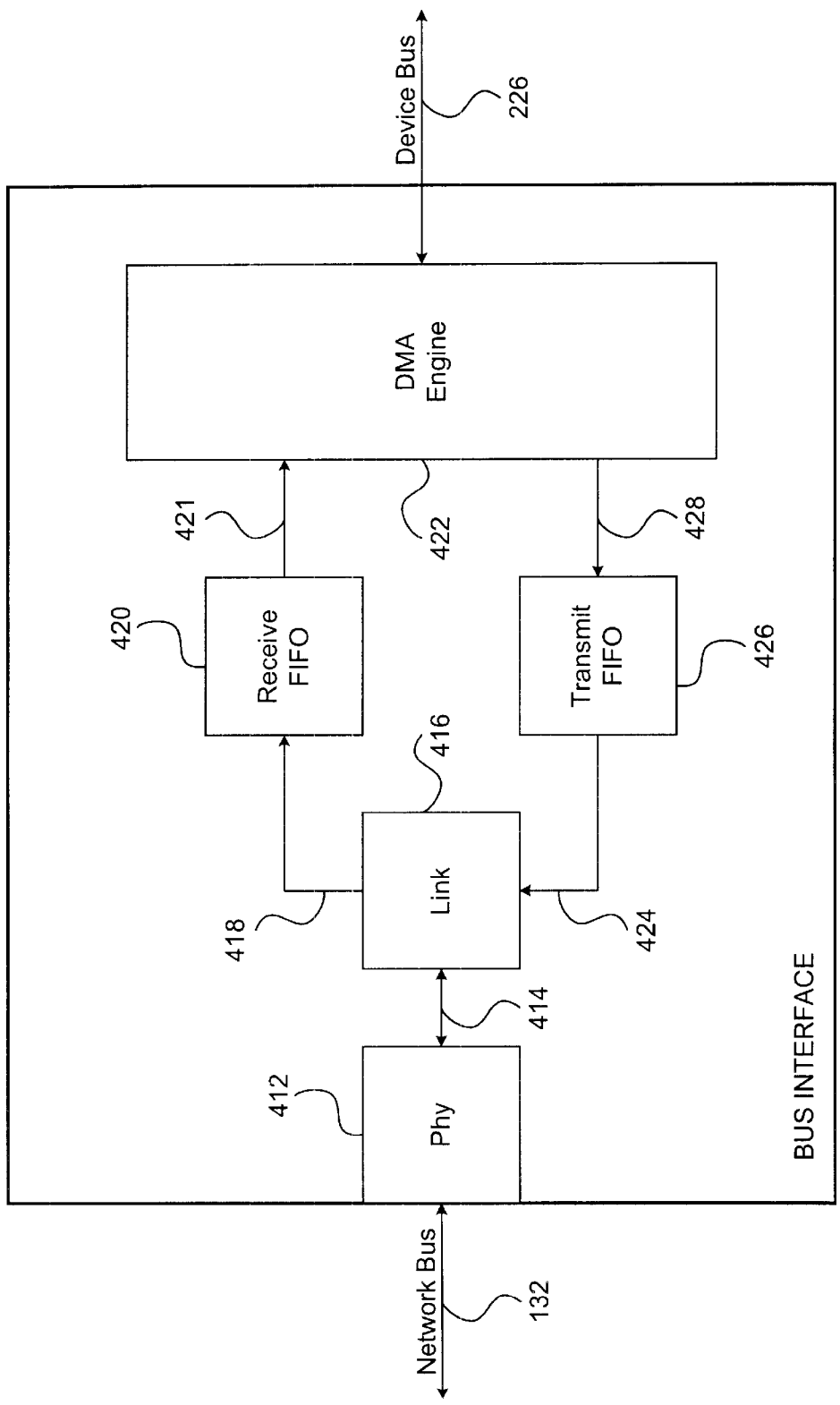
FIG. 4 is a block diagram for one embodiment of the bus interface of FIG. 2, in accordance with the present invention.

Referring now to FIG. 4, a block diagram for one embodiment of the FIG. 2 bus interface 220 is shown, in accordance with the present invention. In the FIG. 4 embodiment, bus interface 220 includes, but is not limited to, a physical layer (phy) 412, a link layer (link) 416, a transmit first-in-first-out register (transmit FIFO) 426, a receive first-in-first-out register (receive FIFO) 420, and a direct memory access (DMA) engine 422.

In the FIG. 4 embodiment, bus interface 220 may preferably be implemented in accordance with a 1394 Open Host Controller Interface (OHCI) Specification, Release 1.0, 1997, which is hereby incorporated by reference. However, in alternate embodiments, bus interface 220 may likewise be effectively implemented utilizing any other appropriate and suitable configuration or architecture. In addition, in alternate embodiments, bus interface may readily be configured to include various other components and elements in addition to, or instead of, those discussed in conjunction with the FIG. 4 embodiment.

During operation of the FIG. 4 embodiment, device 112 preferably receives incoming packets of information from another remote device via network bus 132. The foregoing packets preferably may include header information and optional transfer data which are further discussed below in conjunction with FIGS. 6 and 7. In response, phy 412 and link 416 preferably convert the incoming packets into an appropriate format for use by device 112, and then store the formatted incoming packets into receive FIFO 420 via path 418.

Direct memory access (DMA) engine 422 may then access receive FIFO 420 via path 421 to responsively perform a DMA transfer operation based upon the stored incoming packets. Similarly, DMA engine 422 may also store outgoing packets of information in transmit FIFO 426 via path 428. Link 416 and phy 412 may then responsively convert the outgoing packets into an appropriate format and transmit the converted outgoing packets to another device in network 110 via network bus 132.

In the FIG. 4 embodiment, DMA engine 422 is preferably implemented in accordance with the 1394 OHCI Specification that has previously been incorporated herein by reference. However, in alternate embodiments, DMA engine 422 may likewise be effectively implemented utilizing any other appropriate and suitable configuration or architecture.

In the FIG. 4 embodiment, DMA engine 422 preferably includes, but is not limited to, a standard DMA module, a physical DMA module, and a device bus interface (not shown). During a standard DMA operation, the standard DMA module in DMA engine 422 preferably transfers entire packets (header and optional data) from receive FIFO 420 into standard DMA packets 318 in memory 216. Then processor 212 may execute software instructions 314 to decode the header information and perform the appropriate operation(s). In selected embodiments, the standard DMA operation may be implemented to utilize certain asynchronous receive FIFO (ARF) DMA techniques.

In contrast, during a physical DMA operation, the physical DMA module in DMA engine 422 preferably utilizes hardware circuitry to access and transfer packets (a header and optional data) from receive FIFO 420, and to responsively decode the corresponding header information and directly perform the appropriate physical DMA operation without the use of intervening software. For example, the physical DMA module in DMA engine 422 may analyze a header and directly store corresponding transfer data into a specified address location of physical DMA data 318 of memory 216. The configuration and utilization of header information during a physical DMA operation is further discussed below in conjunction with FIG. 7.

Physical DMA operations are performed using a hardware implementation, and therefore physical DMA is typically a faster and more efficient way of performing a DMA data transfer operation. However, in many network devices, the physical DMA transfer is transparent to device software 312. In certain device applications, it would be advantageous for device software 312 to receive a notification regarding the occurrence of a given physical DMA operation. In accordance with the present invention, a physical DMA notification procedure is further discussed below in conjunction with FIGS. 6 through 9.

Figure 5:
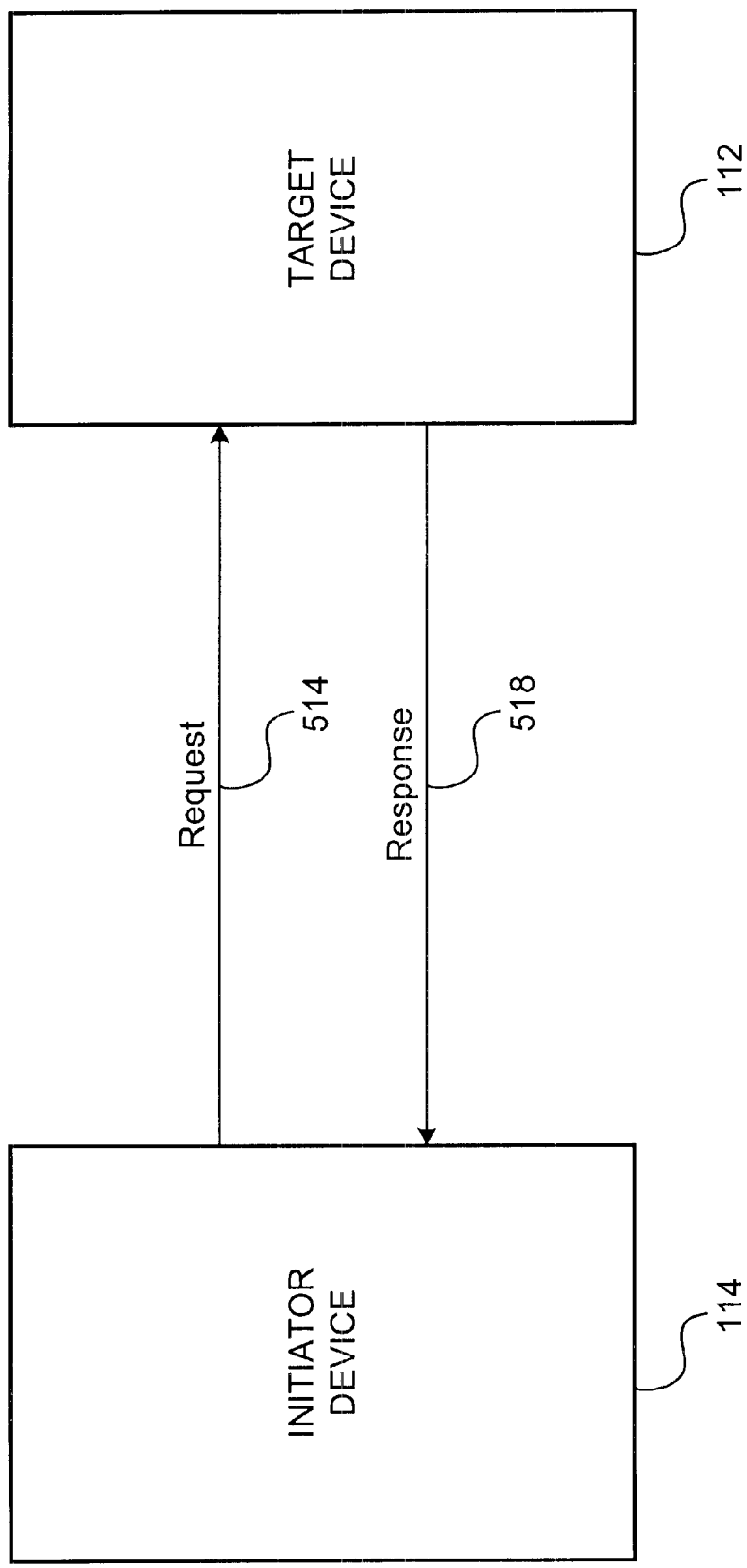
FIG. 5 is a block diagram illustrating a basic data transfer operation, in accordance with one embodiment of the present invention.

Referring now to FIG.5, a block diagram illustrating a basic data transfer operation is shown, in accordance with one embodiment of the present invention. The FIG. 5 embodiment includes an initiator device 114 and a target device 112. In the FIG. 5 embodiment, initiator device 114 corresponds to root device 114 of FIG. 1. However, in other embodiments, the initiator device may similarly correspond to any other device or node in network 110. Furthermore, target device 112 of FIG. 5 may likewise correspond to any desired device or node in network 110.

In a basic data transfer operation, initiator device 114 preferably transmits a transfer request 514 to target device 112. In the FIG. 5 embodiment, transfer request 514 preferably includes one or more transfer packets. The configuration and utilization of the transfer packets are further discussed below in conjunction with FIGS. 6 through 9. The transfer request from initiator device 114 may ask target device 112 to perform any supported type of transfer operation, including a read operation, a write operation, or a lock operation. In response to the transfer request 514 received from initiator device 114, target device 112 preferably then returns a response 518 to initiator device 114.

Figure 6:
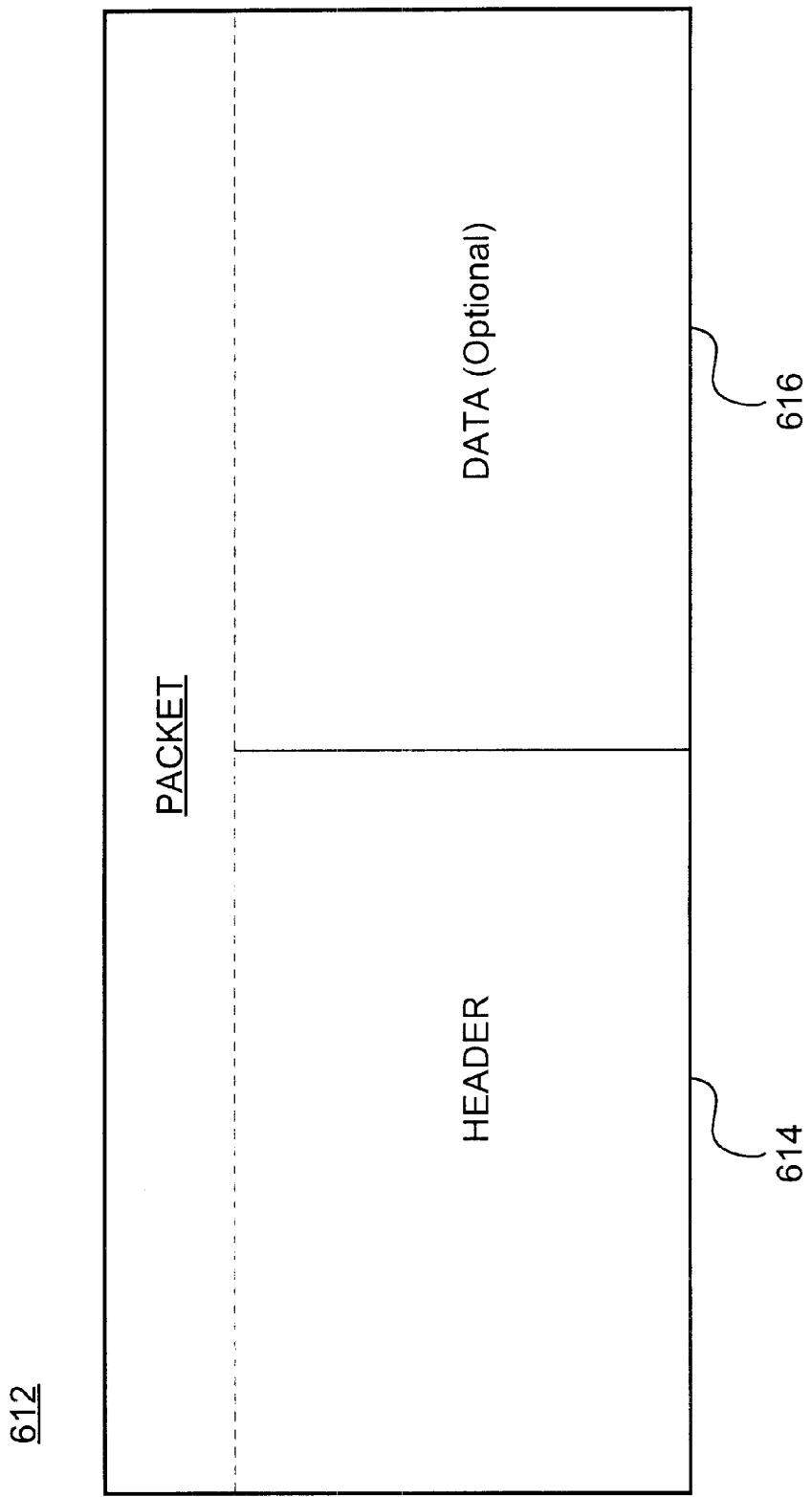
FIG. 6 is a diagram for one embodiment of an exemplary packet, in accordance with the present invention.

Referring now to FIG. 6, a diagram for one embodiment of an exemplary transfer packet 612 is shown, in accordance with the present invention. In the FIG. 6 embodiment, packet 612 includes, but is not limited to, a header 614. In certain cases, packet 612 may also include transfer data 616. For example, when a packet 612 is initially received by target device 112, the incoming packet 612 typically includes data 616 during a DMA write operation. In contrast, during a DMA read operation, when a packet 612 is initially received by target device 112, the incoming packet 612 typically does not include data 616. In alternate embodiments, packet 612 may readily include other elements in addition to, or instead of, those shown in the FIG. 6 embodiment. The configuration and functionality of header 614 are further discussed below in conjunction with FIGS. 7 through 9.

Figure 7:
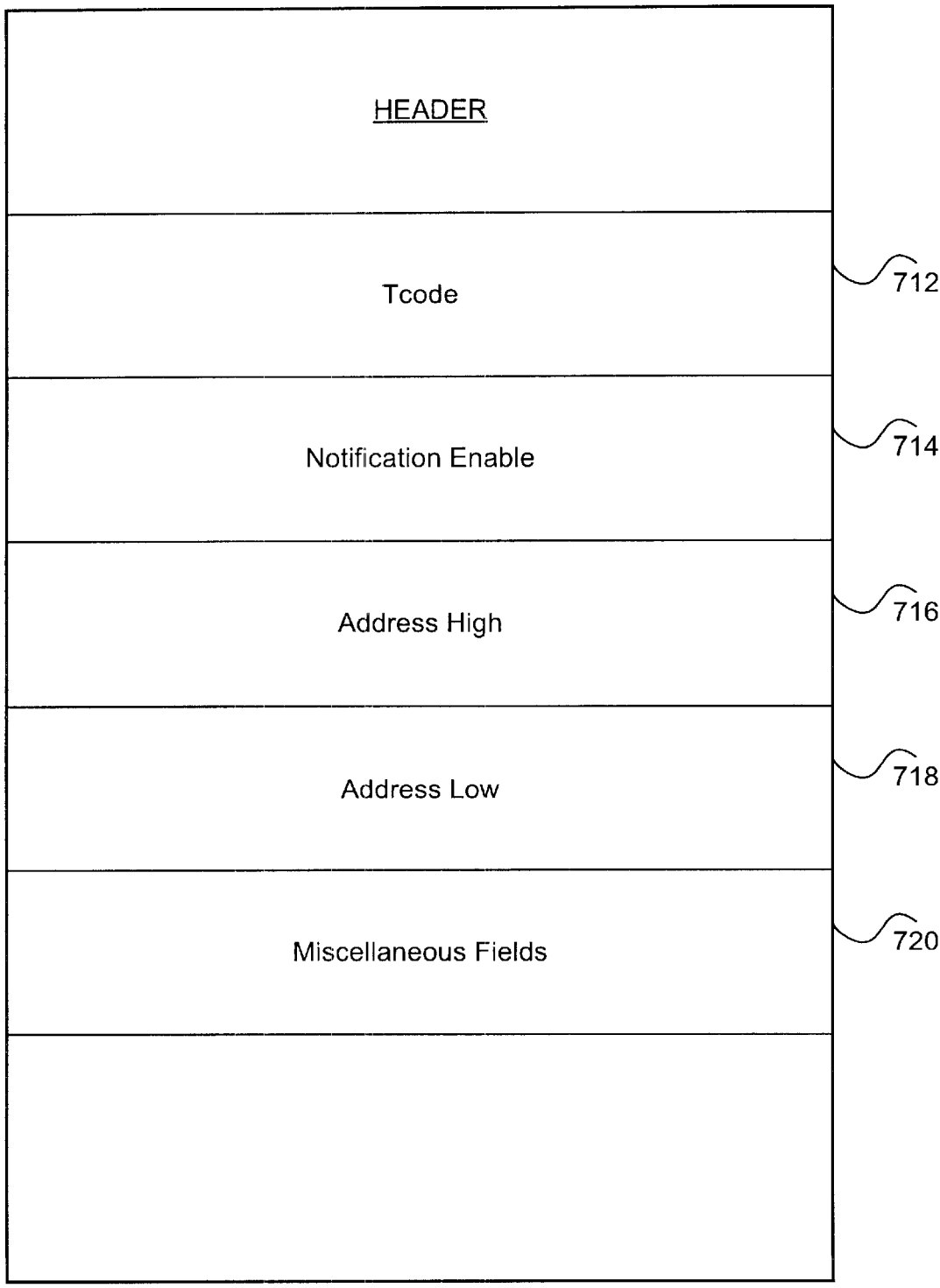
FIG. 7 is a diagram for one embodiment of the header from FIG. 6, in accordance with the present invention.

Referring now to FIG. 7, a diagram for one embodiment of the FIG. 6 header 614 is shown, in accordance with the present invention. In the FIG. 7 embodiment, header 614 preferably includes, but is not limited to, a Tcode 712, a notification enable 714, an address high 716, an address low 718, and miscellaneous fields 720. In alternate embodiments, header 614 may readily include other elements or fields in addition to, or instead of, those shown in the FIG. 7 embodiment.

In the FIG. 7 embodiment, Tcode 712 preferably includes information to facilitate decoding of packet 612. For example, Tcode 712 may include information indicating the type of data transfer operation requested by initiator device 114. In accordance with the present invention, notification enable 714 preferably includes information that either enables or disables DMA engine 422 from notifying device software 312 about the occurrence of a physical DMA operation. In certain embodiments of the present invention, notification enable 714 may be located in a separate Tcode extension field or a priority field (not shown) in header 614. In alternate embodiments, notification enable 714 may similarly be provided from any suitable source, and may also be stored in any other appropriate location in target device 112. The functionality of notification enable 714 is further discussed below in conjunction with FIG. 8.

In the FIG. 7 embodiment, address high 716 preferably includes information to specify whether a requested DMA operation is a physical DMA operation. For example, in one embodiment, if address high 716 equals zero, then DMA request 514 corresponds to a physical DMA operation. In the FIG. 7 embodiment, in a physical DMA operation, DMA engine 422 preferably maps address low 718 directly to an address space in memory 216 of target device 112 for transfer of physical DMA data 318 (FIG. 3).

Figure 8:
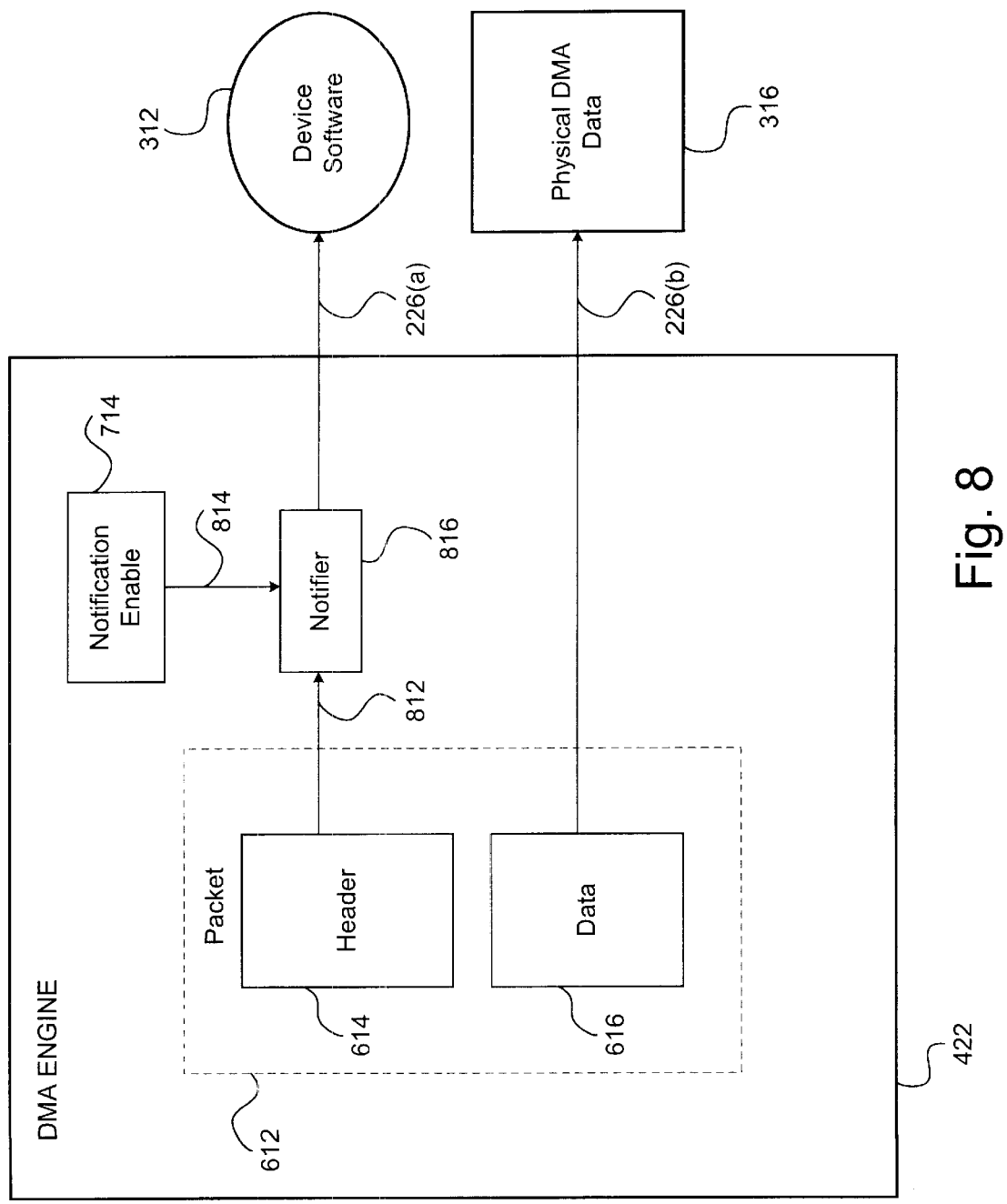
FIG. 8 is a block diagram illustrating a physical direct memory access operation, in accordance with one embodiment of the present invention.

Referring now to FIG. 8, a block diagram illustrating a physical DMA operation is shown, in accordance with one embodiment of the present invention. For purposes of illustration, the physical DMA operation of FIG. 8 is discussed in the context of a single incoming packet 612 that is transferred during a DMA write operation. However, the present invention may be effectively utilized to perform any type of physical DMA operation, and may also sequentially transfer any desired number of packets 612.

In the FIG. 8 embodiment, initially, DMA engine 422 receives packet 612 from initiator device 114. If address high 716 of header 614 indicates a physical DMA operation, then notifier module 816 examines notification enable 714 to determine whether to notify device software 312 about the occurrence of the current physical DMA operation. Notifier module 816 thus permits DMA engine 422 to selectively filter the notifications of physical DMA operations to eliminate time-consuming analysis of unnecessary notifications by device software 312.

If notification enable 714 authorizes notifier module 816 to notify device software 312 regarding the occurrence of the physical DMA operation, then notifier module 816 preferably provides the information in header 614 to device software 312 via paths 812 and 226(a) as the actual notification. In alternate embodiments, notifier module 816 may similarly provide various other types of notifications to device software 312. In the FIG. 8 embodiment, DMA engine 422 also analyzes the information contained in header 614 to determine how to perform the requested DMA write operation. In a DMA write operation, DMA engine 422 preferably transfers data 616 from packet 612 into physical DMA data 316 of memory 216 via path 226(b), as discussed above in conjunction with FIG. 7.

In accordance with the present invention, device software 312 is therefore notified of a current physical DMA operation. In various device applications, this timely notification may facilitate optimal utilization of device resources. For example, in a certain embodiment is which an extended series of packets are being transferred by physical DMA for subsequent data processing by device software 312, an initial notification of the physical DMA operation may advantageously permit device software 312 to perform an overlapping processing procedure that begins at the time of the initial notification, rather than waiting until the entire DMA data transfer operation is complete. The present invention therefore facilitates and promotes intelligent functioning of device software 312.

Figure 9:
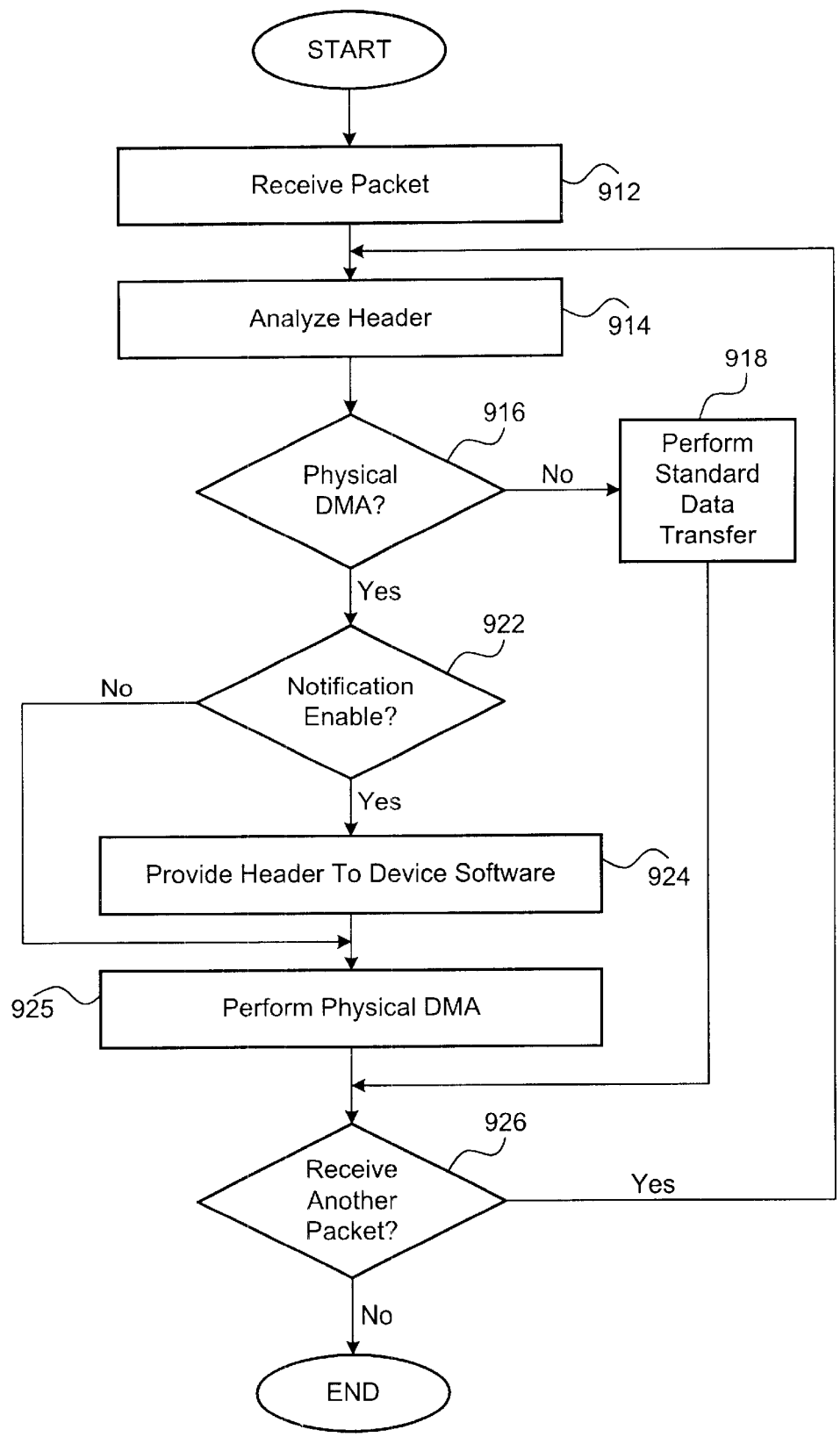
FIG. 9 is a flowchart of method steps for performing a physical direct memory access operation, in accordance with one embodiment of the present invention.

Referring now to FIG. 9, a flowchart of method steps for performing a physical DMA operation is shown, in accordance with one embodiment of the present invention. In the FIG. 9 embodiment, initially, in step 912, DMA engine 422 in target device 112 receives a packet 612 from an initiator device 114. Then, in step 914, DMA engine 422 analyzes a header 614 from the received packet 612. In step 916, DMA engine 422 determines whether the received packet 612 corresponds to a physical DMA operation or to a standard transfer operation. If the received packet 612 corresponds to a standard transfer operation, then, in step 918, target device 112 perform a standard transfer operation, and the FIG. 9 process advances to step 926.

However, in step 916, if the received packet 612 corresponds to a physical DMA operation, then, in step 922, notifier module 816 determines whether notification enable 714 authorizes a notification to be sent to device software 312 regarding the occurrence of the current physical DMA operation. If notification enable 714 does not authorize a notification to be sent to device software 312, then the FIG. 9 process advances to step 925. However, if notification enable 714 does authorize a notification to be sent to device software 312, then, in step 924, notifier module 816 preferably provides the header 614 from the received packet 612 to device software 312 as a notification of the occurrence of the current physical DMA operation.

In step 925, DMA engine 422 performs the requested physical DMA operation. Then, in step 926, DMA engine 422 determines whether another packet 612 has been sent to target device 112 by an initiator device 114. If another packet 612 has been sent to target device 112, then the FIG. 9 process returns to foregoing step 914. Alternately, in step 926, if another packet 612 has not been sent to target device 112, the FIG. 9 process then terminates.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for effectively performing a data transfer operation, comprising:

software instructions configured to control a target device;

a processor configured to execute said software instructions;

an initiator device that transmits a transfer request to said target device, said transfer request including a transfer packet for a DMA operation, said transfer packet including a header and optional transfer data; and a transfer engine that performs an analysis procedure upon said header of said transfer packet to determine how to perform said data transfer operation, said transfer engine transmitting a notification of said data transfer operation to said software instructions after a notifier module analyzes a notification enable field to determine whether to transmit said notification to said software instructions, said notifier module transmitting said header to said software instructions as said notification, whenever authorized by said notification enable field.

2. The system of claim 1 wherein said transfer module performs a physical direct memory access operation concurrently with transmitting said header to said software instructions.

3. The system of claim 2 wherein said transfer module performs said physical direct memory access operation by directly mapping an address low field in said header to a physical direct memory access data location in said target device.

4. The system of claim 1 wherein said software instructions perform an overlapping process in response to said notification.

5. The system of claim 2 wherein said transfer engine sequentially handles a series of said transfer packets until said data transfer operation is complete.

6. A method for effectively performing a data transfer operation, comprising the steps of:

executing software instructions with a processor to control a target device;

transmitting a data transfer request to said target device by utilizing an initiator device, said data transfer request including a transfer packet that is accessed by a transfer engine, said transfer packet including a header and optional transfer data, said transfer engine performing an analysis procedure upon said header of said transfer packet to determine how to perform said data transfer operation; and transmitting a notification of said data transfer operation to said software instructions with said transfer engine after a notifier module analyzes a notification enable field to determine whether to transmit said notification to said software instructions, said notifier module transmitting said header to said software instructions as said notification, whenever authorized by said notification enable field.

7. The method of claim 6 wherein said transfer module performs a physical direct memory access operation concurrently with transmitting said header to said software instructions.

8. The method of claim 7 wherein said transfer module performs said physical direct memory access operation by directly mapping an address low field in said header to a physical direct memory access data location in said target device.

9. The method of claim 6 wherein said software instructions perform an overlapping process in response to said notification.

10. The method of claim 7 wherein said transfer engine sequentially handles a series of said transfer packets until said data transfer operation is complete.

* * * * *